(12) United States Patent
Coni et al.

(10) Patent No.: US 9,092,100 B2
(45) Date of Patent: Jul. 28, 2015

(54) MULTITOUCH TOUCH-SENSITIVE DEVICE WITH MULTIFREQUENCY CAPACITIVE DETECTION

(75) Inventors: Philippe Coni, Saint Jean d'Illac (FR);
Yves Sontag, Bordeaux (FR)

(73) Assignee: Thales, Inc., Neuilly sur Seine (FR)

( * ) Notice: Subject to any disclaimer, the term of this patent is extended or adjusted under 35 U.S.C. 154(b) by 235 days.

(21) Appl. No.: 13/525,235

(22) Filed: Jun. 15, 2012

(65) Prior Publication Data

US 2012/0319993 A1   Dec. 20, 2012

(30) Foreign Application Priority Data

Jun. 17, 2011  (FR) ...................................... 11 01860

(51) Int. Cl.
*G06F 3/041* (2006.01)
*G06F 3/044* (2006.01)

(52) U.S. Cl.
CPC .............. *G06F 3/044* (2013.01); *G06F 3/0416* (2013.01); *G06F 2203/04104* (2013.01)

(58) Field of Classification Search
CPC .... G06F 3/044; G06F 3/0416; G06F 3/03547
USPC .................. 345/173–174; 178/18.06
See application file for complete search history.

(56) References Cited

U.S. PATENT DOCUMENTS

| | | | |
|---|---|---|---|
| 5,565,658 A | 10/1996 | Gerpheide et al. | |
| 5,886,687 A * | 3/1999 | Gibson | ........................ 345/173 |
| 5,920,309 A | 7/1999 | Bisset et al. | |
| 6,002,389 A | 12/1999 | Kasser | |
| 6,492,979 B1 | 12/2002 | Kent et al. | |
| 7,986,193 B2 * | 7/2011 | Krah | ............................... 331/44 |
| 8,154,529 B2 | 4/2012 | Sleeman et al. | |
| 8,599,155 B2 * | 12/2013 | Bartling et al. | ............... 345/173 |

(Continued)

FOREIGN PATENT DOCUMENTS

| | | |
|---|---|---|
| EP | 0567364 B1 | 8/2001 |
| EP | 2 009 542 A1 | 12/2008 |

(Continued)

OTHER PUBLICATIONS

French Search Report for Counterpart French Application No. 1101860, 8 pgs. (Feb. 9, 2012).

*Primary Examiner* — Alexander Eisen
*Assistant Examiner* — Sanjiv D Patel
(74) *Attorney, Agent, or Firm* — Blakely, Sokoloff, Taylor & Zafman LLP

(57) ABSTRACT

The general field of the invention is that of touchscreen devices with projected capacitive detection comprising a matrix-form touch pad comprising conductive rows and columns, said pad being linked to control means and electronic reception and analysis means. The control means generate, for each conductive row and column, a first periodic emission voltage emitted at a first working frequency and a second periodic emission voltage emitted at a second discrimination frequency, different from the first frequency. The electronic reception and analysis means are arranged so as to determine, for each row and for each column, the impedance of a first reception voltage at the working frequency and the impedance of a second reception voltage at the discrimination frequency. According to predetermined values, the values of the two impedances are representative of a touch on the touch pad and its location on the row or on the column concerned.

5 Claims, 3 Drawing Sheets

(56) References Cited

U.S. PATENT DOCUMENTS

| | | |
|---|---|---|
| 2005/0206565 A1 | 9/2005 | Osaka et al. |
| 2008/0018608 A1 | 1/2008 | Serban et al. |
| 2008/0158180 A1* | 7/2008 | Krah et al. .................. 345/173 |
| 2009/0194341 A1 | 8/2009 | Noustainen |
| 2009/0273579 A1 | 11/2009 | Zachui et al. |
| 2010/0060589 A1* | 3/2010 | Wilson ........................ 345/173 |
| 2010/0149110 A1* | 6/2010 | Gray .......................... 345/173 |
| 2010/0177059 A1 | 7/2010 | Wang et al. |
| 2010/0245246 A1* | 9/2010 | Rosenfeld et al. ........... 345/163 |
| 2011/0115732 A1 | 5/2011 | Coni et al. |
| 2012/0007813 A1* | 1/2012 | Chae et al. .................. 345/173 |
| 2012/0038583 A1* | 2/2012 | Westhues et al. ............ 345/174 |

FOREIGN PATENT DOCUMENTS

| | | |
|---|---|---|
| EP | 2 196 889 A2 | 6/2010 |
| FR | 2 925 714 | 6/2009 |
| FR | 2 925 717 | 6/2009 |
| FR | 2 952 730 A1 | 5/2011 |
| GB | 2 453 403 A | 4/2009 |
| WO | WO 2004/061808 A1 | 7/2004 |
| WO | WO 2008/157253 A1 | 12/2008 |
| WO | WO 2009/106736 A1 | 9/2009 |
| WO | WO 2009/106737 A1 | 9/2009 |

* cited by examiner

MULTITOUCH TOUCH-SENSITIVE DEVICE WITH MULTIFREQUENCY CAPACITIVE DETECTION

BACKGROUND OF THE INVENTION

1. Field of the Invention

The field of the invention is that of touch-sensitive surfaces or "touchscreens" with capacitive detection and, more particularly, so-called "multitouch" touch-sensitive surfaces allowing for the detection of two simultaneous touches. This function is essential for producing, for example, image "zooms" or rotations. This invention can be applied to different uses but it is particularly well suited to the constraints of the aeronautical domain and aircraft instrument panels.

2. Description of the Prior Art

The so-called "projected" capacitive detection consists in producing a detection matrix arranged so as to detect the local variations of capacitance introduced by the proximity of the fingers of the user or of any other conductive designating object. The so-called projected capacitive technology has two main variants which are:

"self capacitive" detection which consists in reading the rows and then the columns of the array of keys of the matrix;

so-called "mutual capacitive" detection consisting in reading each intersection of the array of keys of the matrix.

The "mutual capacitive" technology entails reading the entire pad. Thus, if the matrix has N rows and M columns, N×M acquisitions must be made, which makes the production of pads of large size, with high resolution and low response time, problematical. Furthermore, the capacitance to be measured in "mutual capacitance" mode is lower than that obtained in "self capacitance" mode, which makes the use of gloves by the user problematical.

The advantage of the "self capacitive" detection is that, for the above pad, the system requires only N+M acquisitions to produce a reading of the matrix. The major drawback of the "self capacitive" technology is the absence of any simple solution for resolving the problem of phantom touches or "ghosts". FIG. 1 illustrates this problem. It represents a partial view of a matrix $M_{LC}$ of conductive rows and columns. In this figure and in the subsequent figures, the touches are represented by two fingers. When two simultaneous touches occur at $(X_I, Y_I)$ and $(X_J, Y_J)$, the system detects the two columns $(X_I, X_J)$ and the two rows $(Y_I, Y_J)$ that have been stressed. These two rows and these two columns correspond to real touches but also to two phantom touches G positioned at $(X_I, Y_J)$ and $(X_J, Y_I)$ without the system being able to decide a priori which are the correct touches.

To resolve this problem of ghosts, countermeasures have been developed. A first solution consists in producing a time discrimination based on the low probability of the occurrence of a simultaneous touch given that the acquisition speed of the pad is very rapid. However, perfectly simultaneous touches corresponding, for example, to the approach of two fingers to perform an image rotation on the touch-sensitive surface, are not processed. The term "multitouch" device cannot therefore be truly applied.

The patent application US2010/0177059 proposes a method with which to eliminate the doubt by measuring row/column coupling capacitances in the vicinity of the touch. Since this coupling does not exist in the case of a ghost, it is then easy to determine the position of the real touch. However, such a measurement requires a large number of analog switches, seven for each row/column pair in the case cited. In addition to the not inconsiderable excess cost, the addition of switches increases the coupling capacitance relative to the ground when they switch over the rows or the columns. In fact, they act as if a large number of fingers were placed on the pad.

As an example, an excellent switch in JFET (Junction Field Effect Transistor) technology has a coupling capacitance of 10 pF, whereas a finger has a capacitance of the order of 1 pF. If 4 switches are implemented, a variation of 1 pF has to be measured on a value of 40 pF instead of 10 pF with a single switch. The result of this is a loss of sensitivity in a ratio of 4. This loss of sensitivity is problematical when the user is wearing a glove or when, in the presence of electromagnetic noise, the signal/noise ratio is degraded.

The capacitance measurement poses other problems. There are primarily three methods for measuring a capacitance.

The oldest is the capacitive divider bridge, one arm of which consists of a reference capacitance and the other of the capacitance to be measured. A second method uses a relaxation oscillator whose frequency depends on the value of the capacitance to be measured. These two methods are known to be sensitive to reading noise, in particular in cases of radiofrequency interference, which are commonplace on an aircraft.

The third method, and the most widely used these days on consumer products for capacitive protection on touch pads, is measurement by charge transfer. There are different variants which give a good signal-to-noise ratio. This method consists in powering the capacitance to be measured by a "burst" of square pulses until the latter is charged to a reference value. The number of pulses needed to obtain the reference charge is representative of the capacitance to be measured.

However, this measurement requires a plurality of switches, necessary to the transfer of the charges and to the generation of the bursts. The stray capacitances of these switches limit the dynamics of the signal and degrade the signal-to-noise ratio.

Another drawback with this method is its weak robustness to the electronic interferences emitted at a frequency roughly equal to that of the bursts. In practice, the rows and the columns then behave as antennas and pick up the electromagnetic waves. They will induce stray electrical currents in addition to the measurement bursts and provoke erroneous measurements.

Finally, the capacitive measurement methods mainly use an alternating signal of relatively high frequency to perform the measurement. In certain environments such as aircraft cockpits, the electromagnetic emission levels of the equipment have to be considerably low in order not to disturb certain sensitive equipment such as the sensors or antennas. The charge transfer measurement method implements square signals. These signals generate harmonics which create disturbances over a wide frequency band, well above the thresholds allowed by the standards.

In conclusion, the projected capacitive touchscreens currently have many drawbacks which make them difficult to use in an aircraft cockpit or in any critical environment. In practice, as has been seen, the detection of the touches may be falsified by phantom touches or by external electromagnetic interferences. Furthermore, the measurement principle may interrupt the electromagnetic environment.

SUMMARY OF THE INVENTION

The touch-sensitive device according to the invention does not have these drawbacks. Its physical principle relies on the use of emission voltages at two different frequencies. It is demonstrated that the output signals on the rows and on the columns have, according to the frequency, different impedances representative not only of the presence of a touch on a row and a column but also of its position on that row and that column.

This device is "dual touch" without ghosts, it is insensitive to reading noise and to external electromagnetic interferences and, finally, it is compatible with the electromagnetic emission standards such as those specified in the aeronautical field. Furthermore, the user can use this touch-sensitive surface with gloved hands with the same level of performance.

More specifically, the subject of the invention is a touch-screen device with projected capacitive detection comprising a matrix-form touch pad comprising a plurality of conductive rows and conductive columns, said pad being linked to:

electronic control means generating, for each conductive row and column, emission voltages and;

means for receiving and electronically analyzing the reception voltages from each conductive row and column, characterized in that:

the electronic control means generate, for each conductive row and column, a first periodic emission voltage emitted at a first frequency denoted working frequency and a second periodic emission voltage emitted at a second frequency denoted discrimination frequency, different from the first frequency;

the electronic reception and analysis means are arranged so as to determine, for each row and for each column:

the value of a first reception voltage at the working frequency and the value of a second reception voltage at the discrimination frequency;

if, according to predetermined values, the values of the two reception voltages are representative of a touch on the touch pad and the location of this touch on the row and on the column concerned.

Advantageously, the value of the working frequency is sufficiently low to provoke very small variations of the resistive portion of the impedances of the reception voltages at this working frequency and the value of the discrimination frequency is sufficiently high to provoke significant variations of the resistive portion of the impedances of the reception voltages at this discrimination frequency.

Advantageously, the means for receiving and electronically analyzing the reception voltages comprise two synchronous demodulators, the first demodulator working at the working frequency, the second demodulator at the discrimination frequency.

Advantageously, the electronic reception and analysis means comprise:

a table of the stored values of the reception voltages at the working frequency of each row and of each column in the absence of any touch;

comparison means establishing, for each row and for each column, the deviations between the measured values of the reception voltages and the stored values of the reception voltages so as to determine whether the measured deviations are representative of a touch on the row or on the column concerned.

Preferentially, the working frequency is between 100 kHz and 500 kHz and the discrimination frequency is between 500 kHz and 5 MHz.

BRIEF DESCRIPTION OF THE DRAWINGS

The invention will be better understood and other advantages will become apparent on reading the following description, given as a nonlimiting example, and by virtue of the appended figures in which.

DETAILED DESCRIPTION

There is a simplified model for electrically describing a capacitive touch-sensitive device comprising a matrix of electrodes consisting of conductive rows and columns. It consists of a representation of the touch where the finger of the operator is capacitively coupled with the matrix by projecting the surface of his or her finger onto the pad. This surface covers at least two electrodes, a first in a row and a second in a column. The operator is then considered to add a capacitance $C_d$ between the earth and at least the row or the column concerned. However, this model remains local and does not take account of the environment of the measurement.

Figure 1:
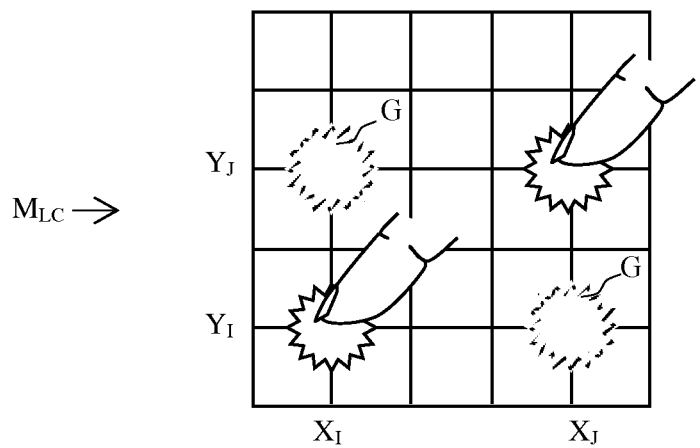
FIG. 1, already commented upon, represents the problem of phantom touches in a projected capacitive touch-sensitive device according to the prior art.
Figure 2:
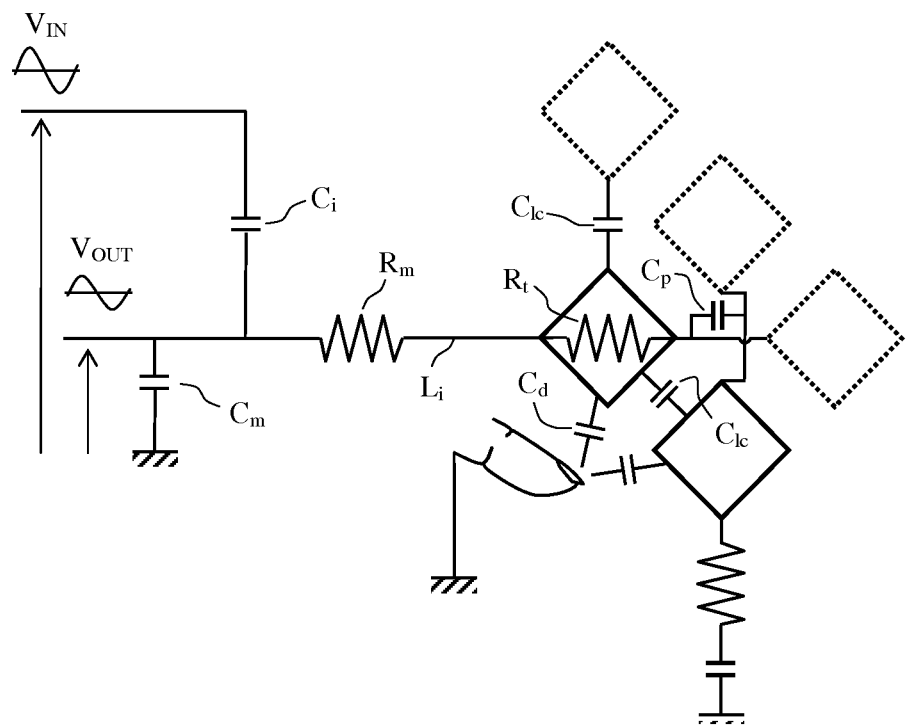
FIG. 2 represents the electric circuit diagram of the electric capacitances and resistances around an intersection between a row and a column of a touch pad.

FIG. 2 represents a more sophisticated model of a capacitive matrix device. Each row is in fact connected to a measurement and/or power supply device through analog switches. These switches add a coupling capacitance $C_m$ relative to the ground and exhibit an electrical resistance $R_m$ provoking an attenuation of the measured signal.

Furthermore, since each row consists of a transparent material of ITO (Indium Tin Oxide) type, which has a certain resistance between the power supply point and the point of contact of the finger, this resistance being all the higher as the finger moves away from the point of connection. If $R_t$ is the resistance of a touch and its connection to the next, then the resistance between the touch on the column n and the edge of the matrix is $n \cdot R_t$.

Also, the array of rows and columns is mutually coupled. In practice, there is a capacitance $C_p$ at each track intersection, each row being intersected by n columns and, also, the rows or columns are coupled with their neighbors. This coupling is represented in FIG. 2 by a capacitance $C_{Ic}$.

Finally, there are also coupling capacitances between the touch pad, its connections and the mechanical parts forming the device, as well as a mutual coupling between the different tracks linking the rows and the columns to the electronic measurement device.

Consequently, the acquisition of a capacitive touch pad cannot be reduced to the acquisition of a simple capacitance projected by an operator. It is the result of this projection onto a complex multipolar component consisting of an association of resistances and capacitances interconnected together.

The device according to the invention exploits this complexity. As can be seen in FIG. 2, in the absence of any object in the vicinity of the matrix, each row $L_i$ is linked to an alternating voltage power supply through an injection capacitance $C_i$ and to a read buffer which has an input impedance consisting of a stray coupling capacitance relative to the ground $C_m$ and an input resistance $R_m$. This row $L_i$ has a resistance per unit of length and is capacitively coupled at each column intersection.

When a finger is placed on a precise point of the row $L_i$, it projects a capacitance onto the portion of the row concerned. The touch-sensitive devices according to the prior art measure only this projected capacitance. This simple measurement does not provide any knowledge as to the position of the touch on the row, this information not being conveyed by the value of the projected capacitance.

The core of the invention is not to consider simply the added capacitance, but its effect on the complex model that is formed by the entire row. In particular, if we consider the resistance $R_{il}$ of the row $L_i$ of length l, then there is a resistance $R_{ia}$ between one end of the row and the point of contact. The resistance $R_{ia}$ is less than $R_{il}$. This resistance value modifies the output signal $V_{OUT}$. This signal $V_{OUT}$ has the values:

$V_{OUT}=Z \cdot V_{IN}$ with $V_{IN}$ being the periodic input signal of frequency F and Z being the impedance of the row which has the value:

$Z=A+Bj$ the terms A and B being functions of the capacitances $C_m$, $C_i$ and $C_d$ and of the resistances $R_m$ and $R_{ia}$.

Figure 3:
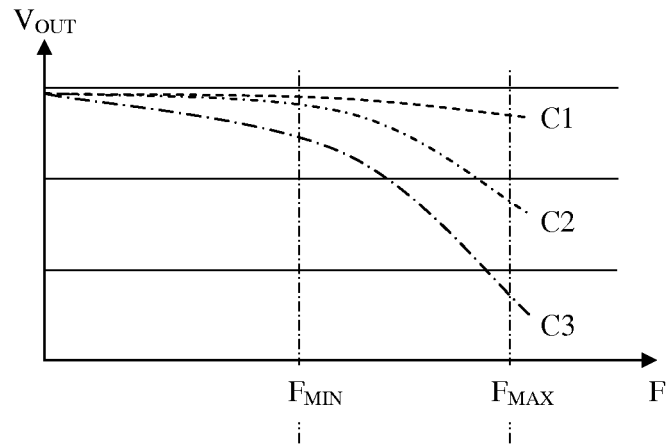
FIG. 3 represents, according to the applied frequency, the variation of the output signal of a row or of a column for three different touch positions in a device according to the invention.

The topology of the model can be likened to the first order to an RC network in which the resistance $R_{ia}$ associated with the capacitance $C_d$ constitutes a first order low-pass filter. FIG. 3 represents, according to the applied frequency, the variation of the output signal of a row for three different touch positions, the first curve C1 for a touch situated at the edge of the row, the second C2 for a touch in the middle of the row, the third curve C3 for a touch at the end of the row. The scale of FIG. 3 is logarithmic on both axes. There is then, as can be seen in FIG. 3, a frequency $F_{miN}$ such that the variations of $R_{ia}$ provoke a minimal variation of $V_{OUT}$ regardless of the position of the touch. Conversely, there is a frequency $F_{MAX}$ such that the variations of $R_{ia}$ provoke a significant attenuation of $V_{OUT}$ according to the position of the touch. Thus, at this frequency $F_{MAX}$, by measuring this attenuation, it is then easy to know the value of the resistance $R_{ia}$ and consequently to determine the position of the point of contact on the row.

Figure 4:
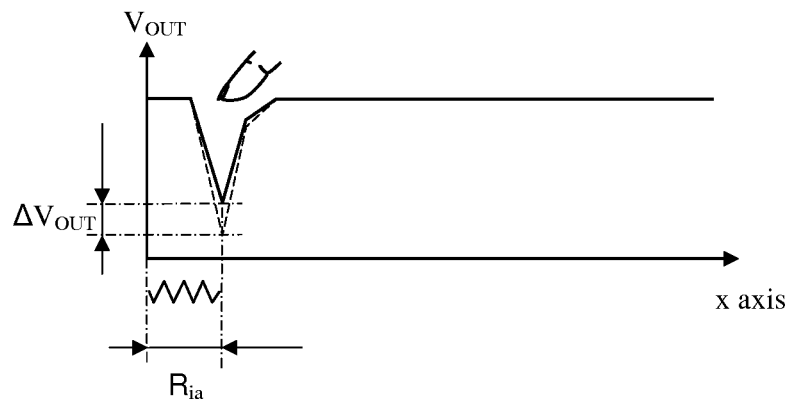
FIG. 4 represents, for two different frequencies, the variations of the output signal of a row or of a column according to the position of the touch in a device according to the invention.
Figure 4:
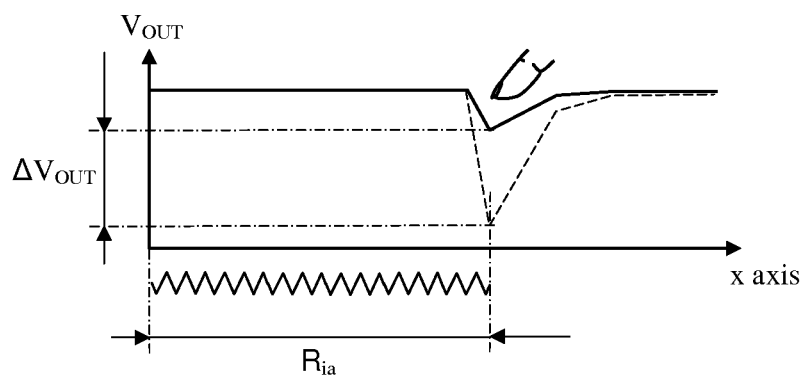

FIG. 4 represents the variations of the output signal $V_{OUT}$ for the frequencies $F_{MIN}$ and $F_{MAX}$ along a conductive row according to the position of the touch. This FIG. 4 comprises two graphs. The top graph represents the variations at the start of the row. The bottom graph represents the variations of the output signal $V_{OUT}$ at the end of the row. In FIG. 4, the curves in unbroken lines represent the variations of the signal $V_{OUT}$ at the frequency $F_{MAX}$ and the curves in broken lines represent the variations of the signal $V_{OUT}$ at the frequency $F_{MIN}$. By measuring $V_{OUT}$ at both frequencies $F_{MIN}$ and $F_{MAX}$, information is obtained as to the value of the resistance $R_{ia}$ of the row measured which makes it possible to determine the position of the point of contact on the row. This measurement is not necessarily very accurate. It is, however, sufficient. In practice, as has been seen, the main problem with the "self capacitive" type detection is the appearance of ghosts. Knowing, even approximately, by double measurement at two different frequencies, the positions of the touches, the indeterminacy between the pair of real touches and the pair of "ghost" touches is removed.

Figure 5:
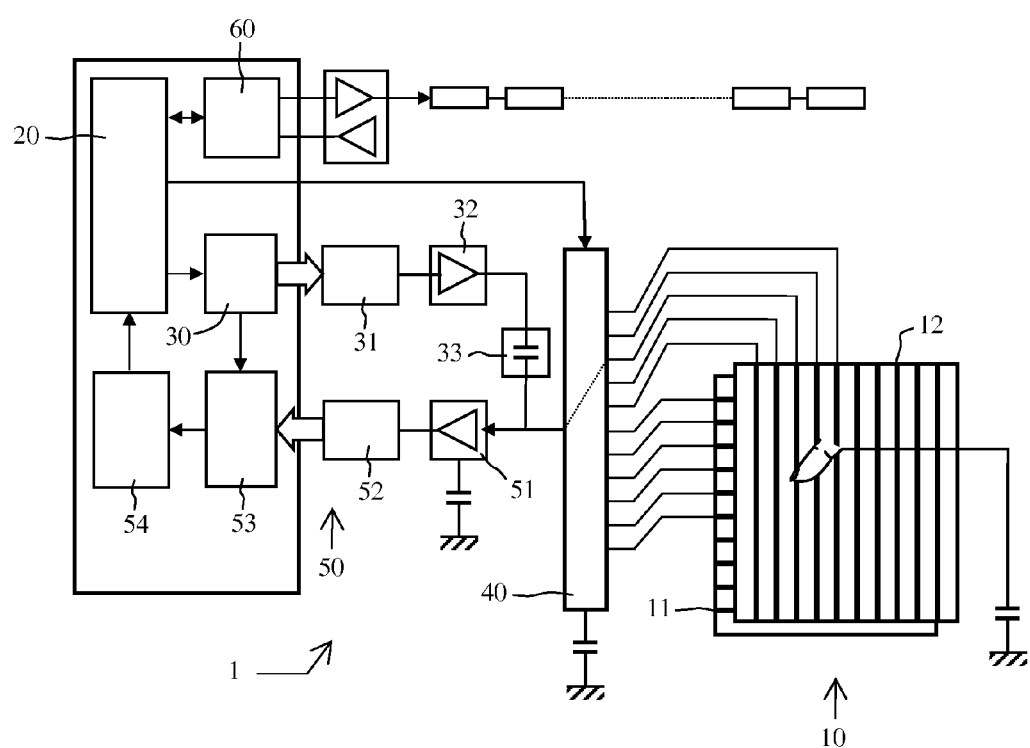
FIG. 5 represents the block diagram of a projected capacitive touch-sensitive device according to the invention.

The device according to the invention comprises means that make it possible to implement this double-frequency capacitive measurement principle. As a nonlimiting example, FIG. 5 represents a touch pad device 1 with projected capacitive detection according to the invention. It essentially comprises:

a touch pad 10 comprising a first substrate comprising a first series of conductive rows 11 parallel to one another and a second substrate comprising a second series of conductive columns 12 parallel to one another;

means 20 for controlling and analyzing the different emission and reception signals necessary for the operation of the touch-sensitive device;

variable frequency sinusoidal high-frequency generator 30 powering the touch pad with alternating voltages $V_{IN}$ via a digital-analog converter "DAC" 31, an amplifier 32 and an injection capacitance 33. Typically, the frequencies are between a few hundred kHz and a few MHz;

a multiplexer 40. It applies the input voltage $V_{IN}$ successively to each column 12 then to each row 11 of the touch pad 10 and directs each corresponding output voltage $V_{OUT}$ to a voltage $V_{IN}$ applied to an electronic processing subsystem 50;

an electronic processing subsystem 50 which comprises a "buffer" memory 51, an analog-digital converter or ADC 52, a synchronous demodulator 53 linked to the frequency generator 30 and electronic filtering means 54. The filtered signals are sent to the analysis means 20;

emission reception means 60, or "UART", standing for "Universal Asynchronous Receiver Transmitter", which ensure the retransmission of the signals processed by the analysis means 20 to the outside which is generally a display device coupled with the touch pad and which displays information that is to be controlled, modified or validated.

The device operates as follows. In nominal mode, the rows and the columns of the pad are scanned permanently and successively by an input voltage $V_{IN}$ at a first working frequency $F_{MIN}$ and a second so-called discrimination frequency $F_{MAX}$. This voltage is generated by the electronic assembly consisting of the means 30, 31, 32 and 33.

Upon a touch symbolically represented by a finger in FIG. 5 and depending on the position of this touch, a certain capacitance is created between the point of contact and the ground, this capacitance being mainly linked by the resistance of rows and columns to the multiplexer 40.

This resistive and capacitive component will provoke a variation of the total impedance Z of the system, and act on the output signal $V_{OUT}$ which has the value, as has been stated, $Z \cdot V_{IN}$ with $Z=A+Bj$. The signal $V_{OUT}$ is then demodulated by the electronic subsystem 50 in order to extract therefrom the effective value $V_{OUT}=Z \cdot V_{IN}$, with $Z=A+Bj$ and $j=\sin(2\pi \cdot F \cdot t)$ by means of a synchronous demodulator 53. The synchronous demodulation is used to filter the electromagnetic interferences "EMI" by acting as a bandpass filter with a high figure of merit, which avoids the use of unselective passive filtering stages.

At least two measurements are made, one at the working frequency $F_{MIN}$, and one at the discrimination frequency $F_{MAX}$. It is possible, for pads of large size, to use a number of discrimination frequencies $F_{MAX}$. Advantageously, the frequencies $F_{MIN}$ and $F_{MAX}$ are modulated and demodulated separately by means of two synchronous demodulators 53, which makes it possible to obtain, in a single measurement, the values of the capacitance C and of the resistance R, representative of the position of the touch.

Finally, the filtered continuous signal from the demodulator 53 is filtered by means of the filtering 54.

If there is no approach of the hand, the touch controller permanently takes an image of the pad at the frequency $F_{MIN}$ and a table in the rest state of the impedances is deduced therefrom by rolling average. This image is subtracted from the table of the instantaneous values of the impedances, to form the table of the deviations, from which it is possible to assign each intersection point its status. This method is partly described in the patent EP 0 567 364 entitled "Process for operating a capacitive tactile keyboard".

Upon a simple touch, its row and column position is computed on the basis of a weighted barycentre around the row signal and the column signal of maximum deviation, the doublet of points given the coordinate of the touch.

In case of multiple aligned touches, the common row or column is computed in the same way, the triplet of points giving the coordinates of the two touches.

In the case of multiple non-aligned touches, the quadruplet of points is measured at the frequency $F_{MIN}$, then at the frequency $F_{MAX}$. The variation of the signal following the variation of frequency is used to determine the rejection of the ghost and the quadruplet of points makes it possible to give the coordinates of the different touches.

As can be seen, the electronic means implemented in the touch-sensitive device according to the invention are simple and effectively resolve the main problems with projected capacitive detection, in other words the detection of phantom touches, the insensitivity to external electromagnetic interferences due to the synchronous detection, the absence of interferences from the electronic environment through the use of pure and harmonic-free sinusoidal signals.

What is claimed is:

1. A dual touchscreen device with projected capacitive detection comprising a matrix-form touch pad comprising a plurality of conductive rows and conductive columns, the pad being linked to:
    electronic control means generating, for each conductive row and column, emission voltages and;
    electronic reception and analysis means for receiving and electronically analyzing reception voltages from each conductive row and column, wherein:
    the electronic control means generate, for each conductive row and column, a first periodic emission voltage emitted at a first frequency denoted working frequency and a second periodic emission voltage emitted at a second frequency denoted discrimination frequency that is different from the first frequency;
    the electronic reception and analysis means are arranged to determine, for each row and for each column:
        a first reception voltage at the working frequency and a second reception voltage at the discrimination frequency;
        when, according to predetermined values, the first and second reception voltages are representative of at least a touch on the touch pad and a location of the touch on the row and/or on the column concerned,
        the working frequency being sufficiently low to provoke very small variations of the reception voltages at the working frequency due to changes in a resistive portion of an impedance of the reception voltages and the discrimination frequency being sufficiently high to provoke significant variations of the reception voltages at the discrimination frequency due to changes in the resistive portion of the impedance, the variations of the resistive portion being representative of the location of at least the touch,
        when the touch includes a simple touch, a position of the touched row and/or column is computed by the electronic reception and analysis means based on a weighted barycentre around the row signal and the column signal of maximum deviation, a doublet of points giving a coordinate of the touch;
        when the touch includes at least two aligned touches, a position of the touched row and/or that is common to the two aligned touches is computed by the electronic reception and analysis means, a triplet of points giving coordinates of the two aligned touches; and
        when the touch includes at least two non-aligned touches, a quadruplet of points is measured at the working frequency and at the discrimination frequency, a variation of a signal following a variation of the working frequency and/or the discrimination frequency is used by the electronic reception and analysis means to determine a rejection of a ghost and the quadruplet of points giving coordinates of the at least two non-aligned touches.

2. The dual touchscreen device as claimed in claim 1, wherein the electronic reception and analysis means comprise two synchronous demodulators, the first demodulator working at the working frequency, the second demodulator at the discrimination frequency.

3. The dual touchscreen device as claimed in claim 1, wherein the electronic reception and analysis means comprise:
    a table of stored values of the reception voltages at the working frequency of each row and of each column in the absence of any touch;
    electronic comparison means establishing, for each row and for each column, deviations between measured values of the reception voltages and the stored values of the reception voltages to determine whether the deviations are representative of a touch on the row and/or on the column concerned.

4. The dual touchscreen device as claimed in claim 1, wherein the working frequency is between 100 kHz and 500 kHz and the discrimination frequency is between 500 kHz and 5 MHz.

5. The dual touchscreen device as claimed in claim 2, wherein the electronic reception and analysis means comprise:
    a table of stored values of the reception voltages at the working frequency of each row and of each column in the absence of any touch;
    electronic comparison means establishing, for each row and for each column, deviations between measured values of the reception voltages and the stored values of the reception voltages to determine whether the deviations are representative of a touch on the row and/or on the column concerned.

* * * * *